(12) United States Patent
Uleski

(10) Patent No.: US 6,952,955 B1
(45) Date of Patent: Oct. 11, 2005

(54) ADJUSTABLE MOUNTING OF TIRE MONITORING ASSEMBLY

(75) Inventor: Michael A. Uleski, Roseville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/900,594

(22) Filed: Jul. 28, 2004

(51) Int. Cl.[7] .............................................. E01C 23/00

(52) U.S. Cl. ...................................................... 73/146

(58) Field of Search ......................................... 73/146

(56) References Cited

U.S. PATENT DOCUMENTS

| | | | |
|---|---|---|---|
| 4,120,230 A | * | 10/1978 | Bunyan ........................ 29/252 |
| 4,783,993 A | | 11/1988 | Lothar et al. |
| 5,181,418 A | | 1/1993 | Bartscher et al. |
| 5,542,158 A | * | 8/1996 | Gronau et al. ................ 24/295 |
| 5,585,554 A | | 12/1996 | Handfield et al. |
| 5,717,135 A | | 2/1998 | Fiorletta et al. |
| 6,549,125 B2 | * | 4/2003 | Nigon et al. ............... 73/146.5 |
| 2003/0005759 A1 | | 1/2003 | Breed et al. |
| 2003/0205090 A1 | | 11/2003 | Jakobsen |
| 2003/0209065 A1 | | 11/2003 | Fonteneau |

* cited by examiner

Primary Examiner—William Oen
Assistant Examiner—Alandra Ellington
(74) Attorney, Agent, or Firm—MacMillan, Sobanski & Todd, LLC.

(57) ABSTRACT

A tire monitoring assembly is used with a wheel and tire assembly having a wheel rim, with the wheel rim including a mounting hole. The tire monitoring assembly includes a sealing grommet having an inner sealing ring, an outer sealing ring, and a main body extending between the inner sealing ring and the outer sealing ring, with the inner sealing ring being pressed through the mounting hole. The assembly also includes a fastener having a head and a shank extending from the head, with the shank extending through a fastener hole in the sealing grommet. A mounting member has a fastener through hole that receives the shank therethrough, a generally semi-spherical surface extending about a first end of the fastener through hole, and a recess extending about a second end of the fastener through hole that receives the inner sealing ring. Also, the assembly includes a housing having a semi-spherical recess in surface contact with and slidable relative to the semi-spherical surface, a slotted fastener hole located within and extending through the semi-spherical recess and having the shank extending therethrough, and feet that maintain contact with the wheel rim. A nut engages the threads of the shank and a curved surface on the housing to thereby secure the housing and semi-spherical mounting member to the fastener, while allowing for limited pivoting of the housing relative to the mounting member to allow for use on various wheel designs.

20 Claims, 3 Drawing Sheets

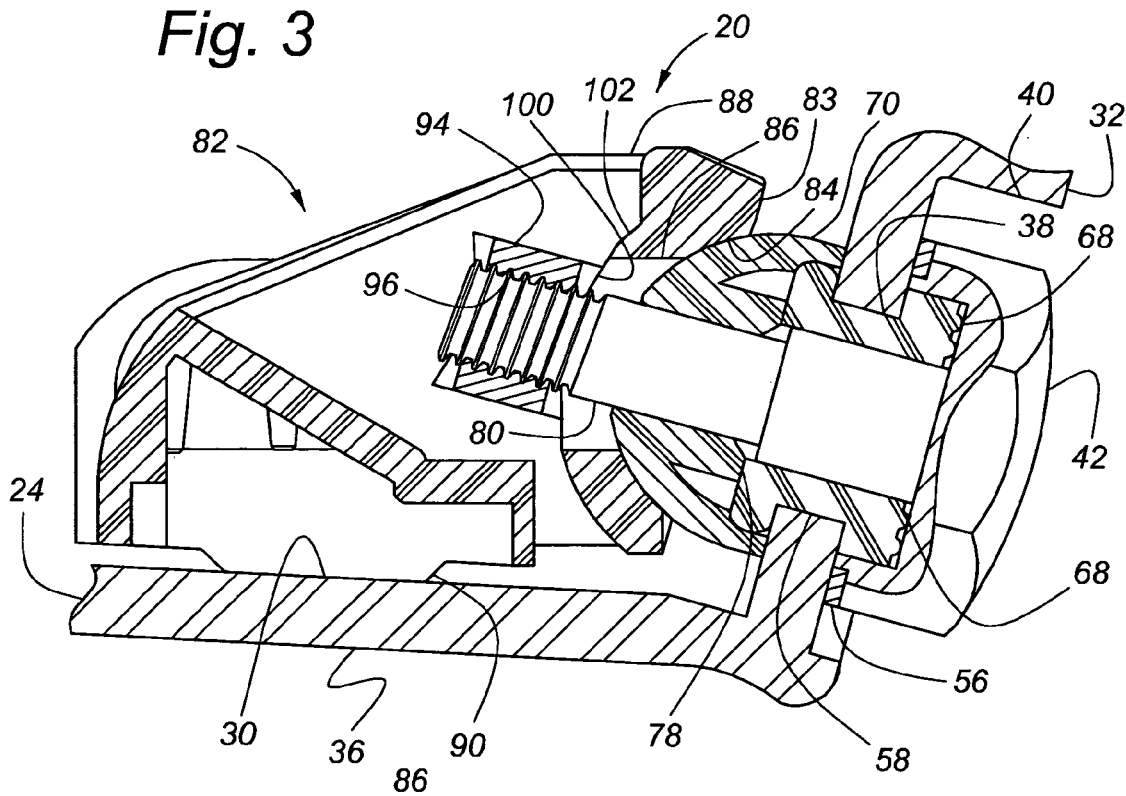
Fig. 3
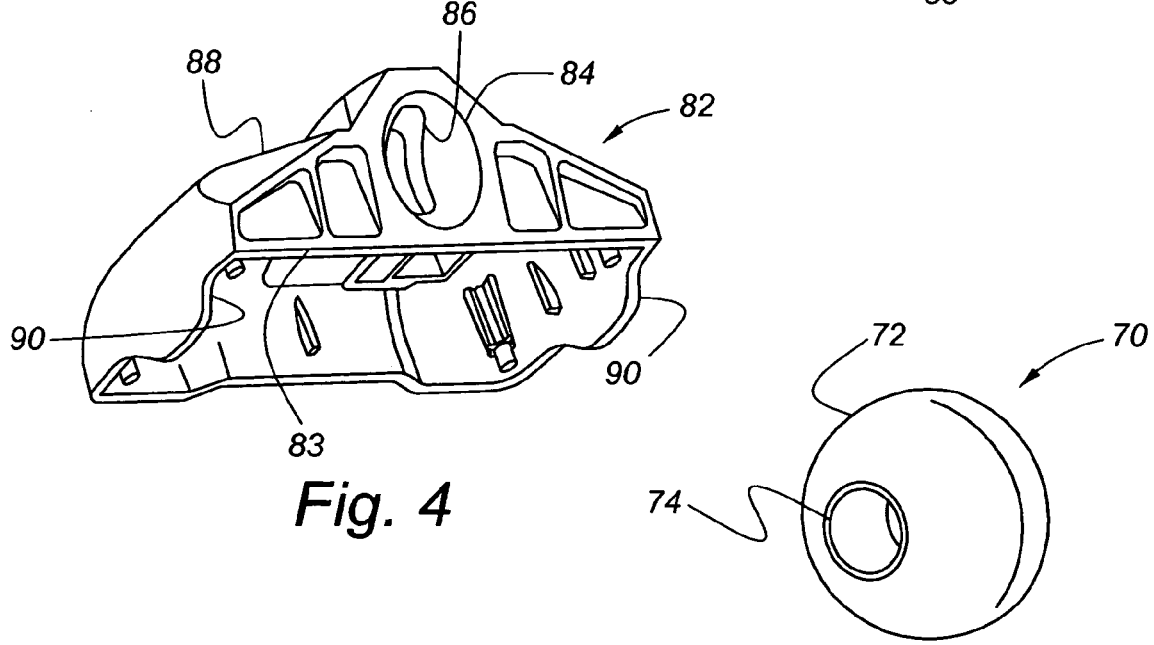
Fig. 4
Fig. 5

ADJUSTABLE MOUNTING OF TIRE MONITORING ASSEMBLY

BACKGROUND OF INVENTION

The present invention relates to tire pressure monitoring systems and associated methods, and in particular mounting such systems to a vehicle wheel.

It is known in the automotive industry to provide for wireless monitoring of tire pressure, and sometimes other parameters, for pneumatic tires mounted on a vehicle. In such monitoring assemblies, pressure and sometimes other sensors, as well as transmitters and power sources, such as batteries, are mounted inside each tire, typically mounted to the valve stem on the wheel. The pressure in each tire is transmitted—typically via radio frequency transmission—to a receiver located in the vehicle. A controller in communication with the receiver processes the information and then may display the tire pressure information, or actuate some type of visual or audible warning device if one of the tires is beyond a certain predetermined threshold, or both. Such assemblies, then, allow the vehicle operator to assure that the vehicle tires are adequately inflated while traveling down the road.

For these monitoring systems, there are circumstances when it is more desirable to mount the tire pressure monitoring systems at locations other than the valve stem. For example, one may wish to employ a common and inexpensive valve stem assembly, thus avoiding the creation of sealing concerns around the stem with the addition of the tire pressure sensor assembly thereto, as well as minimizing the cost of the valve stem assembly. Also, unlike a valve stem, where regular access is required by a vehicle operator, no regular access is required for the pressure monitoring system mounted to the wheel. Thus, one may wish to have the pressure monitoring system mounted on a surface facing inwardly toward the vehicle rather than exposed on an outwardly facing surface, as is required with a conventional valve stem. This will allow the pressure monitoring assembly to remain hidden and avoid contact with objects that may damage the system.

Moreover, since wheel shapes and designs are different, it is also desirable to be able to mount the pressure assemblies on the various shapes of wheels without requiring a different or modified mounting system for each wheel. And, since many wheels not designed originally for a tire pressure sensor system may not have accommodations designed-in to mount the assembly, it is preferable that such an assembly can mount to such wheels with minimum modifications to the wheels.

Thus, it is desirable to have a tire monitoring assembly for tires that can be readily mounted to a variety of wheels without requiring redesigning the wheels or pressure monitoring assemblies, and that overcomes the drawbacks of the prior art.

SUMMARY OF INVENTION

In its embodiments, the present invention contemplates a tire monitoring assembly for use with wheel and tire assembly having a wheel rim, with the wheel rim including a mounting hole having a diameter. The tire monitoring assembly includes a sealing grommet made of an elastomeric material and having an inner sealing ring, an outer sealing ring, spaced from the inner sealing ring, and a main body extending between the inner sealing ring and the outer sealing ring, with the inner sealing ring and the outer sealing ring each having a diameter that is larger than the diameter of the mounting hole and the inner sealing ring being flexible enough to be elastically deformed and pressed through the mounting hole, and with the sealing grommet having a fastener hole extending through the inner sealing ring, the outer sealing ring and the main body. The tire monitoring assembly also preferably includes a fastener having a head and a shank extending from the head and including a threaded end spaced from the head, with the shank extending through the fastener hole in the sealing grommet; and a mounting member having fastener through hole, including a first end and a second end, that receives the shank therethrough, a generally semi-spherical surface extending about the first end of the fastener through hole, and a grommet recess extending about the second end of the fastener through hole that receives a portion of the inner sealing ring therein. Also, the tire monitoring assembly preferably includes a monitor housing having a semi-spherical recess in surface contact with and slidable relative to the semi-spherical surface of the mounting member, a slotted fastener hole located within and extending through the semi-spherical recess and having the shank extending therethrough, and a mount adapted for maintaining contact with the wheel rim; and a retainer for engaging the threads of the shank and the monitor housing to thereby secure the monitor housing and mounting member to the fastener.

The present invention also contemplates a wheel and tire assembly for use with a vehicle including a wheel having a wheel rim with an inner surface, an outer surface and a mounting hole extending between the inner surface and the outer surface. The wheel and tire assembly also includes a tire monitoring assembly including a sealing grommet having an inner sealing ring in contact with the inner surface, an outer sealing ring in contact with the outer surface, a main body extending through the mounting hole, and a fastener hole extending through the inner sealing ring, the outer sealing ring and the main body; a fastener having a head and a shank extending from the head and including a threaded end spaced from the head, with the shank extending through the fastener hole in the sealing grommet; a mounting member having fastener through hole, including a first end and a second end, that receives the shank therethrough, a generally semi-spherical surface extending about the first end of the fastener through hole, and a grommet recess extending about the second end of the fastener through hole that receives the inner sealing ring therein; a monitor housing having a semi-spherical recess in surface contact with and slidable relative to the semi-spherical surface of the mounting member, a slotted fastener hole located within and extending through the semi-spherical recess and having the shank extending therethrough, and a mount that maintains contact with the inner surface of the wheel rim; and a retainer for engaging the threads of the shank and the monitor housing to thereby secure the monitor housing and the mounting member to the fastener.

An advantage of an embodiment of the present invention is that the surface through which the mounting hole in the wheel is located can be oriented within a relatively broad range of angles relative to the surface upon which the monitor housing rests. This allows for flexibility in employing this assembly on various wheel designs, without having to change the parameters of this assembly but still assuring a good seal.

An additional advantage of an embodiment of the present invention is that existing valve stems for air inflation can still be employed, thus minimizing the cost of valve stem assemblies. Moreover, the conventional seals employed with the existing valve stems will not be compromised by the addition of a tire pressure assembly integrated with the valve stems.

Another advantage of an embodiment of the present invention is that, despite the adjustability, the tire pressure assembly will produce a very good seal over the entire useful life of the tire monitoring assembly, even for various wheel designs.

BRIEF DESCRIPTION OF DRAWINGS

FIG. 3 is a cross sectional view, on an enlarged scale, taken along line 3—3 in FIG. 2.

FIG. 4 is a perspective view of a monitor housing in accordance with an embodiment of the present invention.

FIG. 5 is a perspective view of a front side of a semi-spherical mounting member.

DETAILED DESCRIPTION

Figure 1:
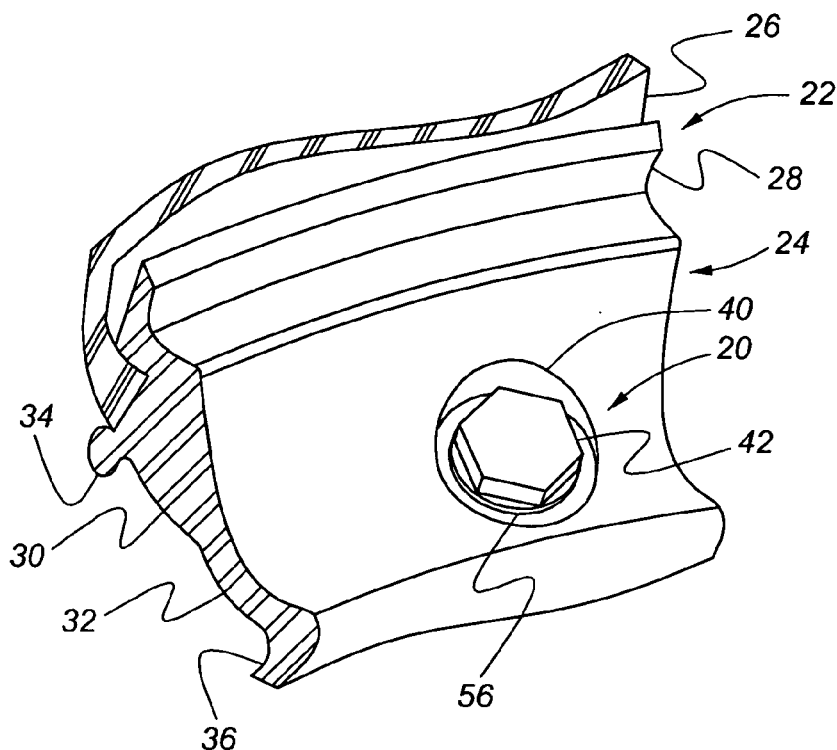
FIG. 1 is a partial, perspective view of an outer surface of a portion of a wheel tire assembly and tire monitoring assembly, in accordance with an embodiment of the present invention.
Figure 2:
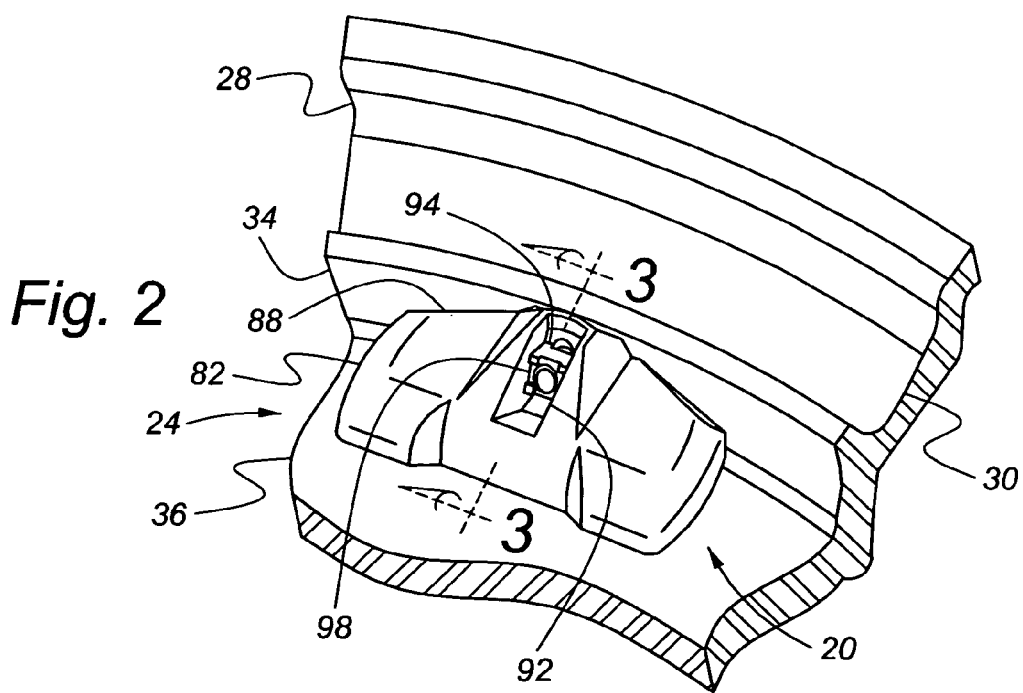
FIG. 2 is a partial perspective view similar to FIG. 1, but illustrating an inner surface of the wheel and tire monitoring assembly.
Figure 6:
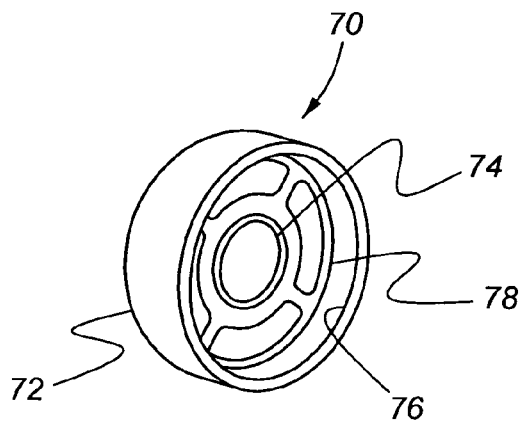
FIG. 6 is a perspective view of a back side of the semi-spherical mounting member of FIG. 5.
Figure 7:
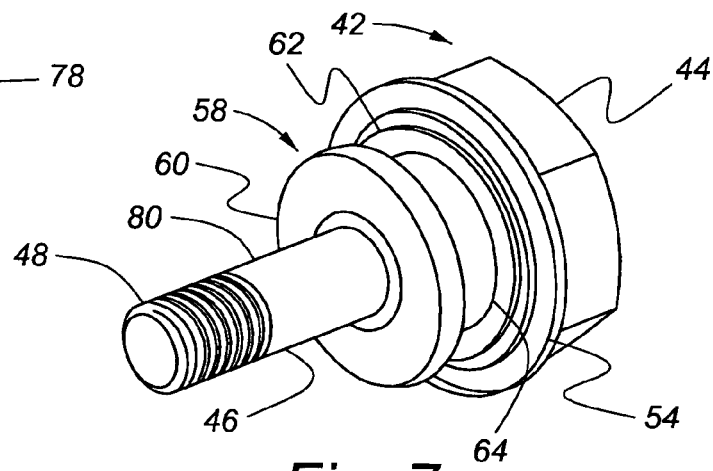
FIG. 7 is a perspective view of a locking bolt with a sealing grommet mounted thereon in accordance with an embodiment of the present invention.
Figure 8:
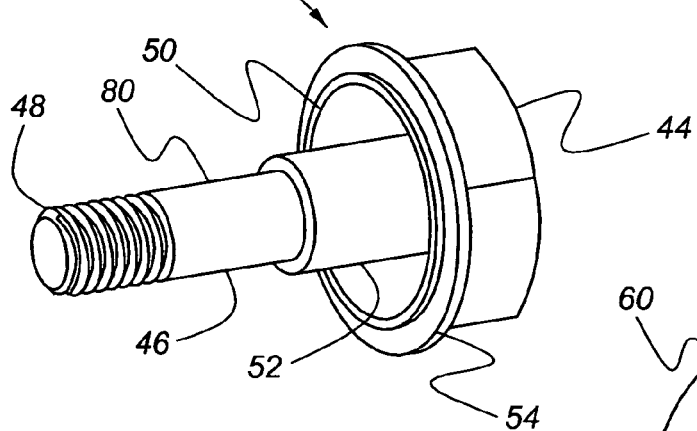
FIG. 8 is a perspective view of the locking bolt of FIG. 7.
Figure 9:
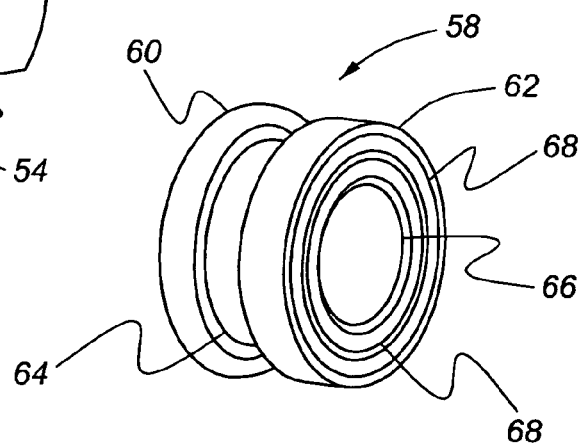
FIG. 9 is a perspective view of the sealing grommet of FIG. 7.

FIGS. 1–9 illustrate a tire monitoring assembly, indicated generally at 20, that is employed with a wheel and pneumatic tire assembly 22, including a wheel, the rim portion of which is indicated generally at 24, with a tire 26 mounted thereon in a conventional fashion. The spider (i.e., center section) of the wheel is not shown because it is conventional in nature and is affixed to or formed as part of the wheel rim, preferably in a conventional fashion.

The wheel rim 24 includes a lip 28 for supporting the bead of the tire 26 on its inner surface 30. Where the term inner surface of the wheel is used herein, this is directed to the surface that is exposed to the air pressure contained in the wheel and tire assembly 22, and where the term outer surface 32 of the wheel is used herein, this is directed to the surface that is exposed to the environment around the wheel and tire assembly 22. This outer surface may have portions that face inwardly toward the wheel well and the vehicle or face outwardly away from the vehicle, such as at the location of the valve stem. The wheel rim 24 also includes a flat tire ridge 34, space from the lip 28, that is conventional in nature and helps prevent the tire bead from dropping into a center well 36 of the rim 24 if the tire loses its air pressure. The rim 24 also includes a mounting hole 38 extending from the inner surface 30 to the outer surface 32, between the center well 36 and the flat tire ridge 34. An optional mounting recessed 40 may be located on the outer surface 32 of the rim 24 around the mounting hole 38, but is not necessary for the practice of this invention so long as the angle between the outer surface 32 and the inner surface 30 is not greater than can be accommodated by the tire monitoring assembly 20 while maintaining a good seal. The valve stem (not shown) is preferably located on the rim 24 at a location away from the tire monitoring assembly 20.

The tire monitoring assembly 20 also includes a locking bolt 42. The locking bolt 42 includes a head 44 having a conventional outer surface that can be manipulated by a conventional wrench or other common tool, and a shank 46, extending from the head 44 and including a threaded end 48 on an opposed end from the head 44. The head 44 includes a generally cylindrical grommet recess 50 extending about the shank 46. The shank 46 includes a larger diameter portion 52 at the end of the shank 46 that is surrounded by the grommet recess 50. The head 44 of the locking bolt 42 also preferably includes a flat washer seat 54 for mounting a flat washer 56 thereon.

The tire monitoring assembly 20 further includes a sealing grommet 58, with an inner sealing ring 60 that has a larger diameter than the mounting hole 38 of the rim 24, an outer sealing ring 62 that also has a larger diameter than the mounting hole 38, and a smaller diameter main body 64 that extends between the inner and outer sealing rings 60, 62. The outer sealing ring 62 includes a pair of circular shaped sealing beads 68 extending therefrom. Also, a bolt pass-through hole 66 extends through the center of the sealing grommet 58, has a diameter that is only slightly larger than the diameter of the large diameter portion 52 of the locking bolt 42, and has a length that is about the same as the length of the large diameter portion 52. The sealing grommet 58 is preferably made of an elastomeric material with good sealing properties. Such material may be rubber, a flexible plastic, or any other suitable material known to those skilled in the art that is typically employed for sealing.

A semi-spherical mounting member 70 is also included in the tire monitoring assembly 20. The semi-spherical mounting member 70 has a semi-spherical outer surface 72 as well as a bolt through-hole 74. A grommet recess 76 surrounds the bolt through-hole 74 at one end and includes a stop surface 78 therein. The bolt through hole 74 has a diameter that is preferably just slightly smaller than a smaller diameter portion 80 of the locking bolt 42.

A hollow monitor housing 82, which is part of the tire monitoring assembly 20, includes an outer wall 83 having a semi-spherical recess 84 within which is defined a locking bolt slot 86. The sides of the outer wall 83 include mounting feet 90 extending therefrom. An upper surface 88 of the monitor housing 82 includes a nut retention recess 92 that is aligned with the locking bolt slot 86. While the mounting member 70 and recess 84 are described and shown as semi-spherical in shape, if so desired, they can have corresponding semi-cylindrical shapes instead. In that instance, the recess 84 would be semi-cylindrical, with the curvature following the length of the bolt slot 86, and the mounting member 70 would have a corresponding cylindrical surface on at least the portion where it will potentially be in surface contact with the recess 84. Therefore, where the term semi-spherical is used herein, that term also includes a semi-cylindrical shape as well.

The hollow area within the monitor housing 82 is preferably sized to receive at least one sensor (not shown), a wireless transmitter (not shown) and a power source (not shown), all of which are known to those skilled in the art. The sensor may measure pressure, temperature, tire rotation, or some other operating parameter, and may include multiple sensors that measure different parameters. The wireless transmitter 24 preferably transmits a radio frequency signal, although other wireless forms of transmitting data may be employed instead, if so desired. The power source may be a battery or some other conventional source of power. Since these components are known in the art, they will not be discussed further herein. Moreover, while the monitor housing 82 may also include additional internal flanges (not shown), or other means for mounting or retaining the components therein, the particular shapes and locations will depend upon the particular components employed, and are not critical to the practice of the present invention and so will not be discussed further herein.

The tire monitoring assembly 20 also includes a nut 94, preferably a square nut, with internal threads 96 sized to engage the threads 48 on the locking bolt 42. The outer surface 98 of the nut 94 is preferably sized and shaped to slide within the nut retention recess 92 in alignment with the bolt threads 48, but not be able to rotate therein. The nut 94 also preferably includes a concave curved surface 100 that matches the convex curvature of the surface 102 of the housing adjacent to the locking bolt slot 86.

The assembly of the tire monitoring assembly 20 to the rim 24 will now be described. During assembly, the inner sealing ring 60 is pressed through the mounting hole 38 in the wheel rim 24. The flat washer 56 is loaded on the shank of the locking bolt 42 and the locking bolt 42 is inserted through the pass-through hole 66 of the sealing grommet 58. Of course, if so desired, the sealing grommet 58 can be mounted on the shank 46 of the bolt 42 prior to inserting the inner sealing ring 60 through the mounting hole 38. The outer sealing ring 62 of the sealing grommet 58 nests within the grommet recess 50 in the head 44 of the locking bolt 42. After assembly is complete, the pair of sealing beads 68 effectively act as small O-ring seals pressing and thus sealing against the surface of the grommet recess 50.

The semi-spherical mounting member 70 is then mounted on the shank 80 of the bolt 42. The monitor housing 82, with its electrical components preferably already mounted therein, is mounted on the semi-spherical mounting member 70. When the monitor housing 82 is mounted on the semi-spherical mounting member 70, the feet 90 are oriented to face toward the inner surface 30 of the center well 36.

The locking bolt slot 86 of the monitor housing 82 allows for some adjustment of the orientation of the housing 82 relative to the bolt 42. This allows the semi-spherical recess 84 to be slid relative to the semi-spherical outer surface 72 until the feet 90 are in contact with the inner surface 30 of the rim 24. The nut 94 is mounted on the threaded end 48 of the bolt 42 in the nut retention recess 92 and oriented so that the curvature of the concave surface 100 is aligned with the convex curved surface 102 of the housing 82. Torque is applied to the bolt head 44 until the appropriate torque value is reached. The tire monitoring assembly 20 is now securely mounted to the rim 24 of the wheel tire assembly 22, with an airtight seal to assure that air does not escape from the wheel tire assembly 22 through the mounting hole 38 in the rim 24.

Accordingly, this tire monitoring assembly 20 can accommodate a difference in angles, for various wheel designs, between the wheel surface through which the mounting hole 38 is located and the inner surface of the center well 36. The particular tire monitoring assembly 20 depicted in this embodiment just described can accommodate a variation in angle of about plus or minus fifteen degrees. Although, if so desired, the proportions of the various components can be modified somewhat to allow for a lesser or greater amount of angle variation between the different wheels upon which this tire monitoring assembly 20 will be mounted.

The tire monitoring assembly 20 also allows for a relatively high torque on the locking bolt 42 when tightening the square nut 94 thereon without unduly deforming the sealing grommet 58. This is because, as the bolt 42 is tightened, bolt head 44 presses against the flat washer 56, which in turn presses against the outer surface 30 of the rim 24, thus preventing the bolt 42 from over compressing the outer sealing ring 62 and the sealing beads 68 mounted thereon. Also, as the bolt 42 is tightened, the nut 94 presses against the monitor housing 82, which in turn presses against the semi-spherical mounting member 70—but the inner sealing ring 60 nests in the grommet recess 76, with the semi-spherical mounting member 70 contacting the inner surface 30 of the rim 24 and consequently preventing the stop surface 78 from over compressing of the inner sealing ring 60. This way, the tire monitoring assembly 20 can be rigidly affixed to the wheel rim 24, conforming to various wheel designs, while still providing a good seal that prevents air leakage out of the wheel and tire assembly 22 over the entire useful life of the tire monitoring assembly 20.

The end result is an improved air seal design over that employed to seal a tire pressure monitoring system that is mounted to a valve stem (not shown). The valve stem, for providing air inflation to the wheel and tire assembly 22, is preferably a conventional pop-in valve stem mounted to the wheel in a conventional fashion. Preferably the valve stem is located away from the tire monitoring assembly 20 so the two do not interfere with each other.

While certain embodiments of the present invention have been described in detail, those familiar with the art to which this invention relates will recognize various alternative designs and embodiments for practicing the invention as defined by the following claims.

What is claimed is:

1. A tire monitoring assembly for use with wheel and tire assembly having a wheel rim, with the wheel rim including a mounting hole having a diameter, the tire monitoring assembly comprising:

a sealing grommet made of an elastomeric material and having an inner sealing ring, an outer sealing ring, spaced from the inner sealing ring, and a main body extending between the inner sealing ring and the outer sealing ring, with the inner sealing ring and the outer sealing ring each having a diameter that is larger than the diameter of the mounting hole and the inner sealing ring being flexible enough to be elastically deformed and pressed through the mounting hole, and with the sealing grommet having a fastener hole extending through the inner sealing ring, the outer sealing ring and the main body;

a fastener having a head and a shank extending from the head and including a threaded end spaced from the head, with the shank extending through the fastener hole in the sealing grommet;

a mounting member having fastener through hole, including a first end and a second end, that receives the shank therethrough, a generally semi-spherical surface extending about the first end of the fastener through hole, and a grommet recess extending about the second end of the fastener through hole that receives a portion of the inner sealing ring therein;

a monitor housing having a semi-spherical recess in surface contact with and slidable relative to the semi-spherical surface of the mounting member, a slotted fastener hole located within and extending through the semi-spherical recess and having the shank extending therethrough, and a mount adapted for maintaining contact with the wheel rim; and a retainer for engaging the threads of the shank and the monitor housing to thereby secure the monitor housing and mounting member to the fastener.

2. The tire monitoring assembly of claim 1 wherein the mount includes a plurality of feet extending from the monitor housing.

3. The tire monitoring assembly of claim 1 wherein the slotted fastener hole is sized to allow for angular displacement of the monitor housing relative to the shank of the bolt of about thirty degrees.

4. The tire monitoring assembly of claim 1 wherein the fastener head includes a grommet recess that receives the outer sealing ring therein.

5. The tire monitoring assembly of claim 4 wherein the outer sealing ring includes at least one sealing bead extending therefrom in contact with the grommet recess.

6. The tire monitoring assembly of claim 1 wherein the fastener is a bolt, and the retainer is a nut mounted on the threaded end of the shank and in surface contact with the monitor housing.

7. The tire monitoring assembly of claim 6 wherein the housing includes a convex curved surface adjacent to the slotted fastener hole and the nut includes a concave curved surface in surface contact with the convex curved surface.

8. The tire monitoring assembly of claim 6 wherein the monitor housing includes a nut retention recess and the nut is shaped to slide within but not rotate within the nut retention recess.

9. The tire monitoring assembly of claim 8 wherein the housing includes a convex curved surface adjacent to the slotted fastener hole and the nut includes a concave curved surface in surface contact with the convex curved surface.

10. A wheel and tire assembly for use with a vehicle comprising:
a wheel having a wheel rim with an inner surface, an outer surface and a mounting hole extending between the inner surface and the outer surface; and
a tire monitoring assembly including a sealing grommet having an inner sealing ring in contact with the inner surface, an outer sealing ring in contact with the outer surface, a main body extending through the mounting hole, and a fastener hole extending through the inner sealing ring, the outer sealing ring and the main body; a fastener having a head and a shank extending from the head and including a threaded end spaced from the head, with the shank extending through the fastener hole in the sealing grommet; a mounting member having fastener through hole, including a first end and a second end, that receives the shank therethrough, a generally semi-spherical surface extending about the first end of the fastener through hole, and a grommet recess extending about the second end of the fastener through hole that receives the inner sealing ring therein; a monitor housing having a semi-spherical recess in surface contact with and slidable relative to the semi-spherical surface of the mounting member, a slotted fastener hole located within and extending through the semi-spherical recess and having the shank extending therethrough, and a mount that maintains contact with the inner surface of the wheel rim; and a retainer for engaging the threads of the shank and the monitor housing to thereby secure the monitor housing and the mounting member to the fastener.

11. The wheel and tire assembly of claim 10 wherein the outer surface of the wheel rim includes a mounting recess located around the mounting hole.

12. The wheel and tire assembly of claim 10 wherein the inner surface of the wheel rim includes a flat tire ridge and the mounting hole is adjacent to the flat tire ridge.

13. The wheel and tire assembly of claim 10 wherein the mount includes a plurality of feet extending from the monitor housing and in contact with the inner surface of the wheel rim.

14. The wheel and tire assembly of claim 10 wherein the monitor housing defines a hollow cavity adapted for receiving a tire pressure monitoring assembly therein.

15. The wheel and tire assembly of claim 10 wherein the fastener head includes a grommet recess that receives the outer sealing ring therein.

16. The wheel and tire assembly of claim 10 wherein the fastener is a bolt, and the retainer is a nut mounted on the threaded end of the shank and in surface contact with the monitor housing.

17. The wheel and tire assembly of claim 16 wherein the monitor housing includes a nut retention recess and the nut is shaped to slide within but not rotate within the nut retention recess.

18. The wheel and tire assembly of claim 16 wherein the housing includes a convex curved surface adjacent to the slotted fastener hole and the nut includes a concave curved surface in surface contact with the convex curved surface.

19. The wheel and tire assembly of claim 18 wherein the slotted fastener hole is sized to allow for angular displacement of the monitor housing relative to the shank of the bolt of about thirty degrees.

20. A tire monitoring assembly for use with wheel and tire assembly having a wheel rim including a mounting hole, the tire monitoring assembly comprising:
a sealing grommet made of an elastomeric material and having an inner sealing ring, an outer sealing ring, spaced from the inner sealing ring, and a main body extending between the inner sealing ring and the outer sealing ring, with the inner sealing ring being flexible enough to be elastically deformed and pressed through the mounting hole, and with the sealing grommet having a fastener hole extending through the inner sealing ring, the outer sealing ring and the main body;
a fastener having a head and a shank extending from the head and including a threaded end spaced from the head, with the shank extending through the fastener hole in the sealing grommet;
a mounting member having fastener through hole, including a first end and a second end, that receives the shank therethrough, a generally semi-spherical surface extending about the first end of the fastener through hole, and a grommet recess extending about the second end of the fastener through hole that receives the inner sealing ring therein;
a monitor housing having a semi-spherical recess in surface contact with and slidable relative to the semi-spherical surface of the mounting member, a slotted fastener hole located within and extending through the semi-spherical recess and having the shank extending therethrough, a mount adapted for maintaining contact with the wheel rim, and a convex curved surface adjacent to the slotted fastener hole; and
a nut that threadably engages the threads of the shank and includes a concave curved surface in surface contact with the convex curved surface of the monitor housing to thereby secure the monitor housing and mounting member to the fastener.

* * * * *